United States Patent [19]
Goldman

[11] Patent Number: 5,661,656
[45] Date of Patent: Aug. 26, 1997

[54] METHOD AND APPARATUS FOR IMPROVED TOOL SET-UP AND ADJUSTMENT USING THIN TACTILE SENSORS

[75] Inventor: Robert B. Goldman, Evanston, Ill.

[73] Assignee: Breed Technologies, Inc., Lakeland, Fla.

[21] Appl. No.: 452,341

[22] Filed: May 26, 1995

[51] Int. Cl.[6] .................................................. G05B 19/401
[52] U.S. Cl. .................. 364/474.37; 364/474.07; 364/474.34; 364/551.02; 72/21.1
[58] Field of Search .................. 364/474.37, 474.07, 364/474.34, 474.1, 551.01, 551.02, 571.01; 72/21.1, 389.1, 702

[56] References Cited

U.S. PATENT DOCUMENTS

| | | | |
|---|---|---|---|
| 4,371,942 | 2/1983 | Damikolas | 364/474.34 |
| 4,486,841 | 12/1984 | Koyama et al. | 364/474.07 |
| 4,797,831 | 1/1989 | Dressing et al. | 364/474.07 |
| 4,918,956 | 4/1990 | Schoch | 72/21.1 |

*Primary Examiner*—Joseph Ruggiero
*Attorney, Agent, or Firm*—Laff, Whitesel, Conte & Saret, Ltd.

[57] ABSTRACT

A method and apparatus for improved tool set-up and adjustment using thin tactile sensors. A method is provided comprising the steps of affixing a plurality of sensing cells to the tool at spaced locations thereon, electrically connecting the sensing cells to a measuring instrument, establishing a measurement event threshold for each electrically connected sensing cell, detecting occurrences of the measurement events for each electrically connected sensing cell, and, in response to detecting these occurrences, adjusting the tool set-up consistent with the measurement events.

26 Claims, 5 Drawing Sheets

| POSITION | TIME (msec) |
|---|---|
| LEFT REAR | 0.00 |
| RIGHT REAR | 0.23 |
| LEFT FRONT | 0.63 |
| RIGHT FRONT | 7.49 |

METHOD AND APPARATUS FOR IMPROVED TOOL SET-UP AND ADJUSTMENT USING THIN TACTILE SENSORS

FIELD OF THE INVENTION

This invention is directed toward a method and apparatus for improved tool set-up and adjustment using thin tactile sensors.

BACKGROUND OF THE INVENTION.

Many manufacturing operations require the use of presses to cut or form material into parts of the proper shape. These presses use removable die sets or tools that come together in a precisely designed fashion to bend, punch, cut, stamp, or otherwise operate upon the material fed into the press. Even some molding operations utilize a press to bring the parts of the mold firmly together. Proper alignment of these tools is essential, or valuable material or the tools themselves may be ruined by improperly adjusted machines.

One critical adjustment is parallelism of the parts of the tool, so that the tool sections or mold portions engage precisely with one another. If one corner of the tool is too high or too low, improper engagement may result.

The set up of tools and their adjustment so that they are precisely oriented to apply force uniformly across their entire surfaces is important. This is frequently done by using carbon impression paper with adjustment and shimming used to adjust the tool. These processes are time consuming, expensive, and prone to human error.

Another adjustment process involves the use of pieces of solder placed between opposing areas of the tool that are designed to come close together, or perhaps even contact one another, during tool adjustment. These pieces of solder are recovered after the tool is cycled, and measured with a micrometer to determine whether the parts of the tool are precisely parallel with one another when the tool portions meet. If a sufficient degree of parallelism is not indicated, shims are installed at one or more points to raise or lower the tool corners, and the set-up process is repeated.

These processes of shimming and measuring are very time consuming, hence expensive. Of course, the prior art adjustment procedures described above will only reveal whether the contact points come together with similar engagement force. The prior art procedures yield no information about the order in which the measurement points come into contact. This information is important for adjusting the tool to ensure that the tool produces acceptable parts. Accordingly, a need arises for a tool set-up and adjustment technique that is fast and accurate, and which does not require expensive testing equipment or costly procedures for the set-up.

SUMMARY OF THE INVENTION

These needs and others are satisfied by the method for tool set-up in accordance with the present invention. The method comprises the steps of affixing a plurality of sensing cells to the tool at spaced locations thereon, electrically connecting the sensing cells to a measuring instrument, establishing a measurement event threshold for each electrically connected sensing cell, detecting occurrences of the measurement events for each electrically connected sensing cell, and, in response to detecting these occurrences, adjusting the tool set-up consistent with the measurement events.

The step of affixing a plurality of sensing cells to the tool comprises affixing a thin tactile sensing cell between opposing, relatively flat areas of the tool at each of the spaced locations. In one form of the invention, the sensing cells are removably affixed to the tool with an adhesive interposed between the sensing cells and the tool. The step of electrically connecting comprises electrically connecting the sensing cells to a high-speed data acquisition and control unit.

In another form of the invention, the high-speed data acquisition and control unit is an integral part of a self-contained, portable measuring instrument, and the method further comprises the steps of recording occurrences of each measurement event and relative time of occurrence of each measurement event to create a plurality of data sets, and displaying the data sets. In one form, the self-contained, portable measuring instrument is a hand-held measuring instrument. In another form of the invention, the high-speed data acquisition and control unit is operatively coupled to a personal computer.

The step of establishing a measurement event threshold for each electrically connected sensing cell comprises establishing an electrically discernible parameter value recognizable by the measuring instrument, for each of the sensing cells to which the measuring instrument is electrically connected, to provide a threshold value for each electrically connected sensing cell. The electrically discernible parameter value may be, for example, electrical resistance. The step of detecting occurrences of measurement events comprises the step of periodically sampling the electrically discernible parameter at each of the sensing cells to provide a sampled value, and the step of periodically sampling the electrically discernible parameter further includes the step of comparing the sampled value to the threshold value.

The step of recording occurrences of each measurement event and relative time of occurrence of each measurement event further comprises the steps of recording, in a memory means, the sampled value corresponding to occurrence of a first measurement event, recording, in a memory means, the sampled value corresponding to occurrence of subsequent measurement events, and recording, in a memory means, relative time of occurrence of the subsequent measurement events with respect to occurrence of the first measurement event. In one embodiment of the invention, the steps of detecting and adjusting further comprise the steps of recording only the first occurrence of a measurement event that exceeds the measurement event threshold for each electrically connected sensing cell, and adjusting the tool-set up consistent with the occurrence.

The step of displaying the data sets may comprise printing the data sets on a printer, or displaying the data sets on a display means. In one form of the invention, the step of displaying the data sets comprises displaying only the first occurrence of a measurement event that exceeds the measurement event threshold for each electrically connected sensing cell, and relative time of occurrence of each measurement event with respect to a first occurrence of a measurement event. In another embodiment, the step of displaying the data sets comprises displaying occurrences of measurement events, and relative times of occurrence, in an amplitude-versus-time graphical format. Data set display for each electrically connected sensing cell is visually distinguishable from data set displays for other electrically connected sensing cells.

In yet another embodiment of the invention, an apparatus for tool set-up is provided for a tool having spaced apart, relatively flat, opposing regions that contact one another during tool set-up or adjustment operation. The apparatus comprises a plurality of sensing cells positioned within these regions, means for electrically connecting the sensing cells to a measuring instrument, means for establishing a measurement event threshold for each electrically connected sensing cell, means for detecting occurrences of measurement events for each said electrically connected sensing cell, and means for adjusting tool set-up such that the tool set-up is consistent with the measurement events. The plurality of sensing cells comprises a plurality of thin tactile sensing cells interposed between the spaced apart, relatively flat, opposing regions. The means for electrically connecting the sensing cells comprises connecting the sensing cells, through associated electrical connectors, to a high-speed data acquisition and control unit. The means for establishing a measurement event threshold comprises entering a threshold value via an associated keyboard. The means for detecting occurrences of measurement events comprises detecting an analog signal value that exceeds the measurement event threshold value, converting the analog value to a digital value, and passing the digital value to a processor.

DETAILED DESCRIPTION OF THE INVENTION

In accordance with the present invention, a method and apparatus for improved tool set-up and adjustment using thin tactile sensors are described that provide distinct advantages when compared to those of the prior art. The invention can best be understood with reference to the accompanying drawing figures.

Figure 1:
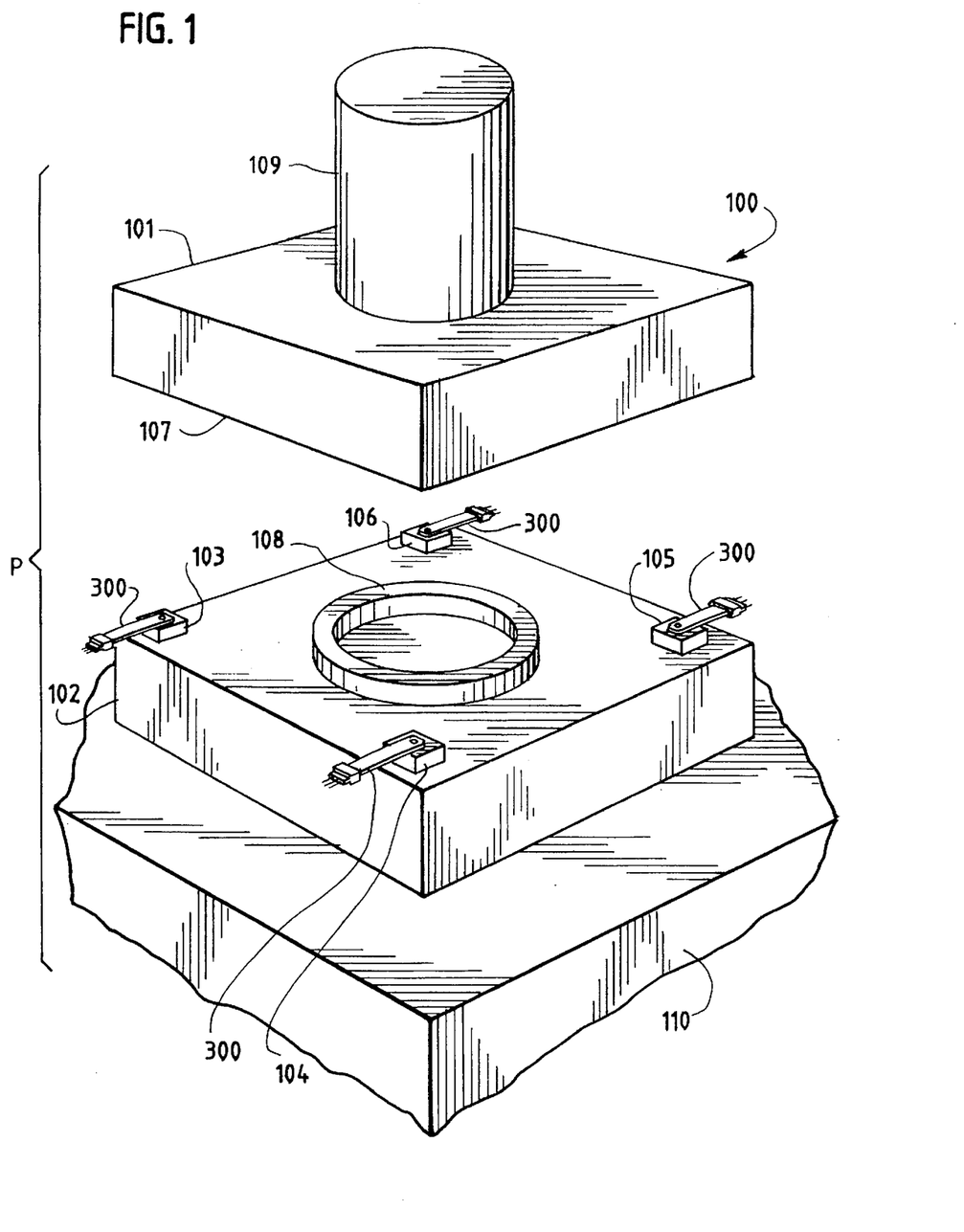
FIG. 1 is a front perspective view illustrating a representative tool.
Figure 2:
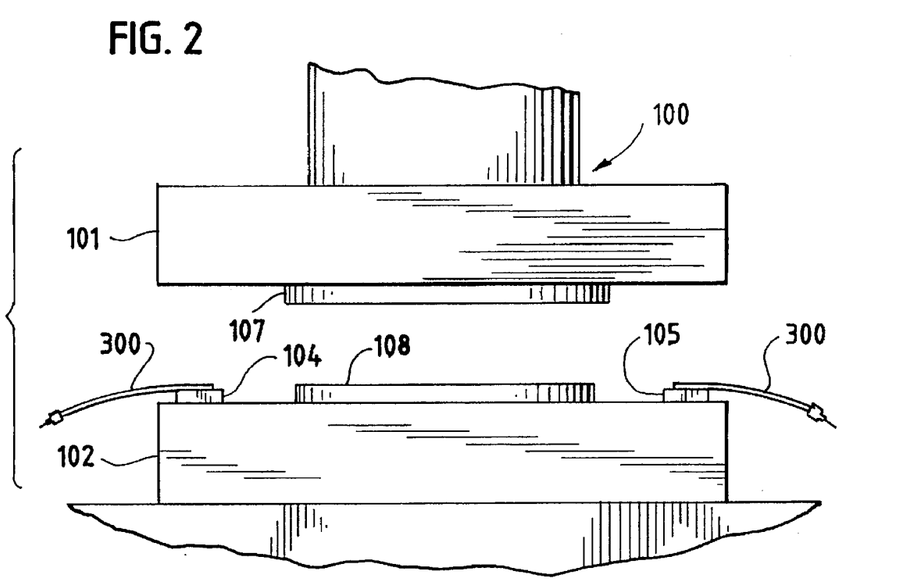
FIG. 2 is a side elevational view of the tool shown in FIG. 1.

FIG. 1 is a front perspective view of a typical tool 100 that shows upper 101 and lower 102 platens that are designed to be installed in a press P between a press ram 109 and a tool bed 110, while FIG. 2 is a side view of the same arrangement. The upper and lower platens 101, 102 include upper and lower forming portions 107, 108 that are designed to operate on a piece of material inserted between the platens 101, 102 when the press is operated. Stops 103–106 are provided adjacent the lower forming portion 108 of the tool. These stops not only prevent the forming portions 107, 108 of the tool from overengaging, which can cause tool damage, but the stops also provide a convenient point for measuring parallelism of the tool portions during set-up and adjustment.

In accordance with a popular technique, carbon impression paper is placed over the stops 103–106, and the tool is cycled. As the tool cycles, the upper platen 101 comes down against the stops 103–106, and by examining the impressions on the carbon impression paper, a skilled operator can tell if the relative engagement force is greater at one stop than at others, indicating a general lack of parallelism.

To correct this problem, the illustrated tool allows shims or spacers to be placed over the stops, so that the upper platen 101 will engage all of the stops 103–106 with approximately the same engagement force. After one or more shims have been inserted, new carbon impression paper is inserted, and the tool is cycled once again, followed by yet another inspection of the impression paper to look for differences in the impressions at each of the stops. Even for a skilled machine operator, this process must generally be repeated many times before satisfactory parallelism is achieved.

Configurations and adjustment points for tools vary considerably in the art, and are generally well-known. In the illustrative embodiment, the tool is an embossing tool installed in a Minster 300 ton press. The tool was equipped with convenient stops, as shown.

Of course, some tools do not have stops. In that event, the carbon impression paper (or solder wire) is placed between accessible opposing flat areas of the tool. This technique may be especially adaptable to molding operations, where the impression paper may be inserted between mating surfaces of the upper and lower mold portion, for example. Proper adjustment of the mating portions of a mold is essential to reduce flashing, minimize material waste, and speed the cleanup process required to remove flash from finished parts.

The tool set-up procedure of the present invention allows tool parallelism to be adjusted and verified without the uncertainty and time-consuming measurement that is common in the current state of the art. To implement the method disclosed, thin, tactile sensors 300 are interposed between spaced, relatively flat, opposed regions of the tool, that generally correspond to the stops 103–106 just described. Of course, as discussed above, if the tool being set up does not have stops, opposing flat areas of the tool that are designed to come into contact with one another can also be employed.

Figure 3A:
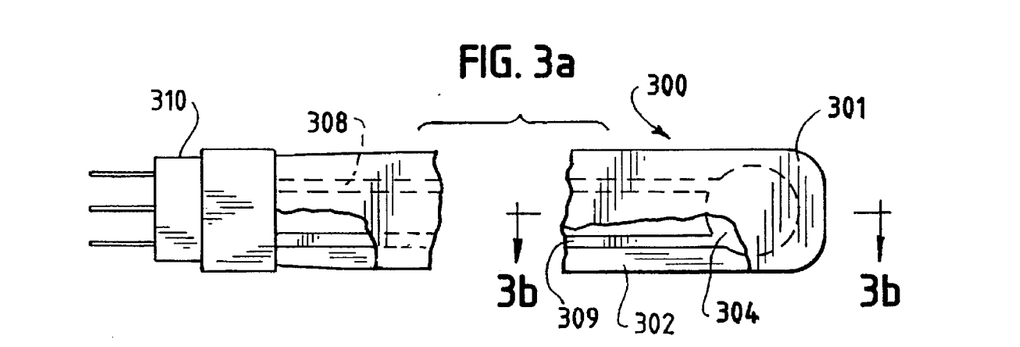
FIG. 3(a) is a top plan view of a thin tactile sensor.
Figure 3B:
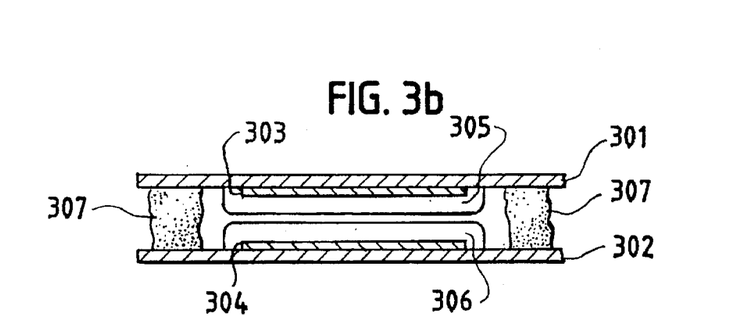
FIG. 3(b) is a section view of the thin tactile sensor of FIG. 3(a), taken along section lines 3(b)–3(b)

The thin, tactile sensors or sensing cells are of the general type disclosed in U.S. Pat. Nos., 5,222,399 and 5,086,652. FIGS. 3(a) and 3(b) illustrate a typical sensing cell, generally depicted by the numeral 300.

Typically, the sensing cell 300 comprises a pair of thin, flexible backing sheets 301, 302, as of a transparent polyester film, each of which is provided with a suitable electrode pattern 303, 304. The electrode pattern may be silver deposited from a silver-based ink that may be screen-printed, for example, on the backing sheets 301, 302, The specific electrode pattern is selected for optimum performance in the specific application, and may be circular, as shown. The conductive patterns may also be comprised of a series of electrically connected concentric circles, or other suitable geometric arrangements.

A pressure sensitive resistive material 305, 306 is deposited over each of the conductive patterns 303, 304. The pressure sensitive resistive material may be a carbon-molybdenum disulfide material in a polyester binder. These regions of pressure sensitive resistive material 305, 306, are interposed between the conductive patterns 303, 304, which are in a confronting relationship. An adhesive material 307 is interposed between the backing sheets 301, 302 to maintain this confronting relationship between the conductive patterns 303, 304.

Each of the conductive patterns 303, 304 has a conductive lead 308, 309 that is also a screen printed silver ink. Each of these conductive leads is captured by a suitable connector 310 that is used to make convenient electrical contact with external instrumentation.

FIG. 1 illustrates a plurality of sensing cells 300, as described above, affixed to the tool 100. Preferably, there are four such sensing cells 300 so affixed, although other quantities of sensing cells may be found to be optimum depending on the particular tool and its corresponding adjustment parameters. The sensing cells 300 are affixed at spaced apart intervals, preferably corresponding to the stops 103–106 provided at spaced apart locations, and providing opposed, relatively flat regions for sensing cell mounting. Each of the sensing cells 300 may be permanently or removably affixed to the tool 100, as by the use of an appropriate adhesive interposed between the sensing cell 300 and its mounting region, such as one of the stops 103.

Figure 4:
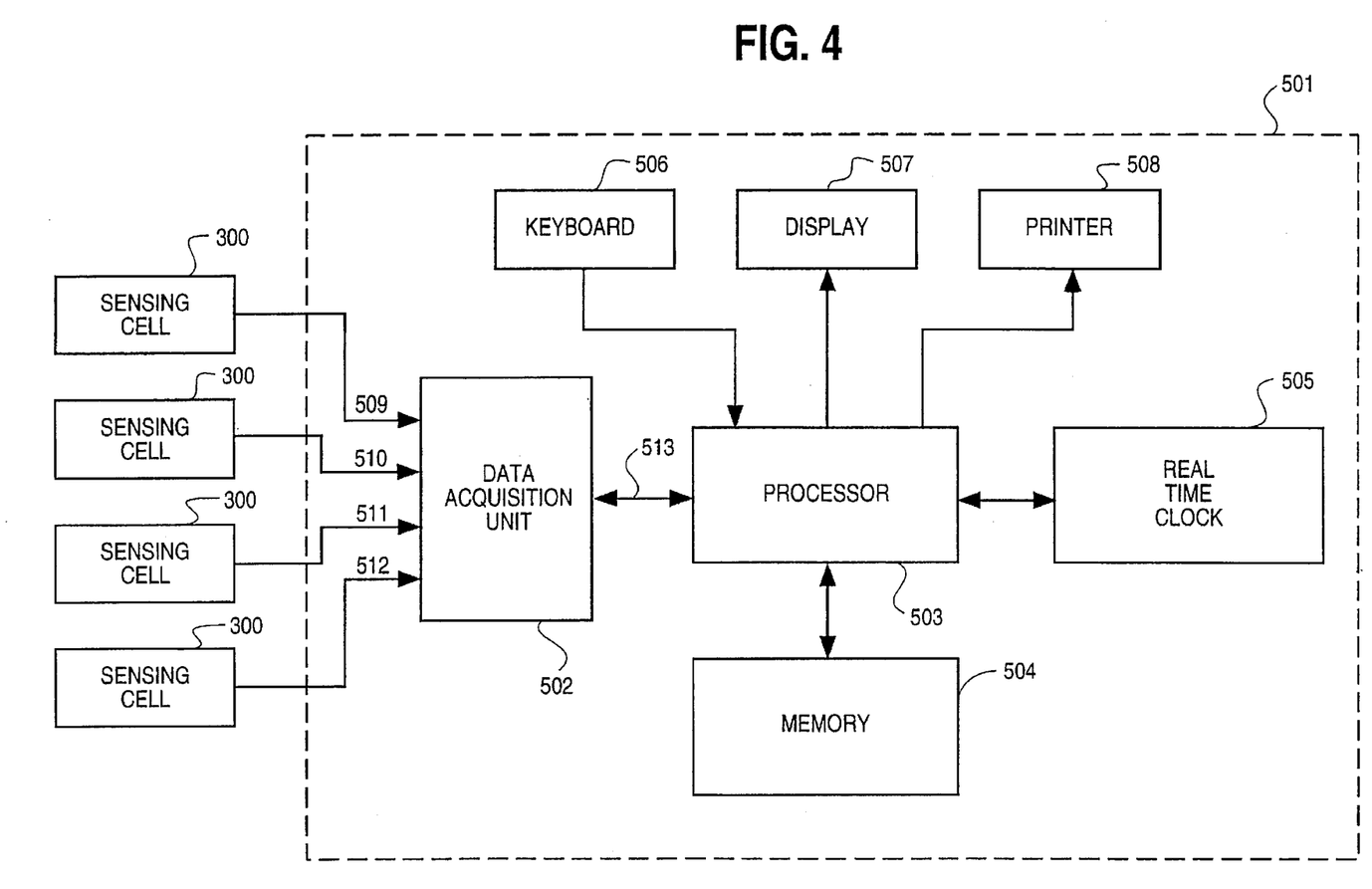
FIG. 4 is a block diagram of a measurement system suitable for use in accordance with the present invention.

FIG. 4 is a block diagram of a measurement system suitable for use in accordance with the present invention. The figure depicts four sensing cells 300 electrically connected to a measuring instrument 501. Preferably, the measuring instrument 501 comprises a high-speed data acquisition and control unit that includes a data acquisition unit 502, a processor 503, a memory 504, a real-time clock 505, a keyboard 506 for data input, a display 507, and, optionally, a printer 508. All of these components of the measuring instrument 501 will be discussed in greater detail in subsequent sections.

By virtue of their construction, each of the sensing cells can provide an electrically discernible indication of an applied force, such as will occur when the sensing cells are contacted by opposing areas of the tool. This electrically discernible indication is a change in electrical resistance.

The data acquisition unit 502 is preferably a high-speed sampling module, of a design well-known in the art. Generally, a data acquisition module 502 of the type contemplated has sensitive input circuitry that is responsive even to small changes in input signals, and associated high-speed analog-to-digital (A-to-D) converters that rapidly convert an input signal level to a digital data word that can be appropriately processed by the processor 503.

For some types of tools, where the rate of closure is relatively rapid, the sampling rate of the A-to-D converters may have to be quite fast, such as on the order of one sample per input every 50 microseconds (μs). This sampling rate is easily achievable using known techniques. Other tool configurations may require that data samples be acquired at less frequent intervals.

Each of the sensing cells 300 is electrically connected to a corresponding input 509–512 of the data acquisition unit. Of course, in order to condition the input signals from the sensing cells 300 properly, so that they can be readily sensed by the data acquisition unit 502, it may be necessary to apply a precisely regulated voltage, for example, to one electrical contact of each sensing cell, thus transforming each input resistance into an input current. Similarly, a precision voltage divider arrangement, also well-known in the art, may be employed to transform input resistance values into precise voltages.

Regardless of which input configuration is selected, the data acquisition unit 502 has the capability, through input circuitry well understood in the applicable art, of providing an input threshold value below which no input changes will be recognized by the data acquisition unit 502. In this way, a measurement event threshold is established that defines a set of measurement events. Although it is preferable to set the event thresholds at the same value for each sensing cell input, each input of the data acquisition unit 502 is individually programmable, so that the measurement event threshold may be different for each input 509–512. In addition, the threshold value may be set at a very low level, thus making the corresponding input very sensitive to changes in input signals, or the threshold value may be relatively high, decreasing input sensitivity.

In any event, once the measurement threshold values have been established, the expected measurement events have been defined. In practice, these threshold values may be entered through the associated keyboard 506 so that they may be evaluated by the processor 503. The system in accordance with the present invention contemplates that the measuring instrument 501 may be a portable hand-held instrument, or implemented in a personal computer. In a personal computer implementation, the keyboard 506 may be a full size keyboard of the type usually provided with personal computers. If the measuring instrument 501 is implemented as a hand-held instrument, the keyboard 506 could more properly be miniaturized and form an integral part of the hand-held instrument, as a part of a front panel assembly, for example. In the hand-held case, the number of keys may be restricted because of size and space limitations, but could still include numeric keys for limited data entry, and control keys for initiating the described measurement and display processes. Alternatively, instead of numeric keys, up and down arrow keys could be provided for incrementing and decrementing numeric values.

For a hand-held implementation, the processor 503 should preferably be a low-power device, so that the hand-held instrument may operate from battery power. In either case, the processor is preferably a microprocessor, such as an 80486 microprocessor manufactured by Intel Corporation, that can be configured for compatibility with a wide range of peripheral devices. Of course, the power of a microprocessor is not strictly necessary. The instrument could be controlled by hard-wired logic, such as a state machine, well-known in the applicable art.

The process preferably has an associated memory 504 that may comprise a combination of RAM (random access memory) and ROM (read only memory), both for program and data storage as known in the art. Depending on the configuration of the measuring instrument, in a hand-held or personal computer form-factor, the memory 504 may be hard disk, flexible disk, or semiconductor memory in various configurations, or any combination of these.

In one mode of operation, the measuring instrument is configured in a multiple point contact timing mode. In this mode, after an operator has entered the appropriate measurement event thresholds, the tool under test is cycled. Assuming a four-sensor arrangement as described above, with the sensing cells disposed at the four vertices of a rectangle that generally surrounds the contacting portion of the tool, contact with the four sensing cells will not occur at precisely the same time. In this mode, the occurrence of the first measurement event is assigned a relative time of zero, for reference purposes. The first measurement event corresponds to the first sensing cell that is contacted by opposing areas of the tool in such a way that the contact force exceeds that specified by the event threshold.

The data acquisition unit 502 senses the change in input signal amplitude as it crosses the threshold, and the corresponding A-to-D converter transforms this input signal level into a digital word. This digital word is passed along to the processor 503 over a data bus 513, along with identifying indicia that specify the particular input 509–512 at which the threshold event occurred. Optionally, at least in the personal computer configuration, the operator may specify plain language indicia, such as "left-front" or "right-rear," that may be associated with a particular input 509-512 to identify the corresponding sensing cell location and speed up the tool adjustment process.

In the multiple point contact timing mode, the processor 503 records only the first occurrence of a measurement event at each input 509-512. In other words, while the data acquisition unit 502 senses any electrical activity that exceeds the threshold level for any input 509-512, and sends corresponding digital words to the processor 503, along with an input identifier as described above, the processor 503 is interested only in the first threshold event for each input 509-512.

Consequently, the processor 503 examines the data transmitted from the data acquisition unit 502, assigning the first occurrence of a measurement event a relative time value of zero, as mentioned above, thus forming an element of a data set. When the processor 503 sees data corresponding to the first occurrence of a measurement event at a different input, the processor 503 accesses the real-time clock 505 to obtain the elapsed time between the occurrence of this event and the first measurement event. This relative time value is recorded in the memory 504, along with the input identifier, as yet another element of the data set. This process continues until a measurement event has occurred at each input, or a preselected time interval has elapsed. This termination after a preselected interval is necessary in the event that the tool is so far out of alignment that contact never occurs at one or more of the sensing cells.

Figure 5:
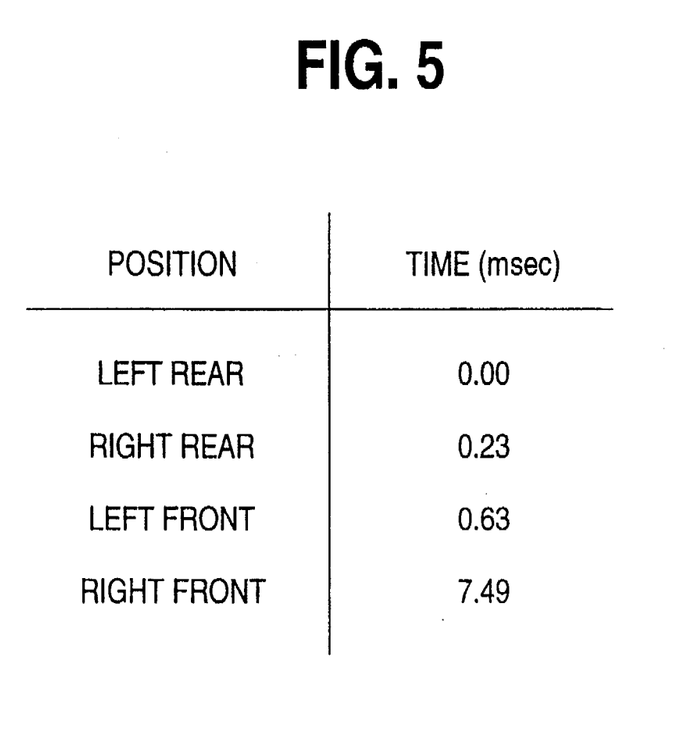
FIG. 5 is a table of events reflecting relative time of occurrence.

A table of events can then be displayed that reflects relative time at which contact occurred at each sensing cell, as illustrated in FIG. 5. In the personal computer embodiment, a display 507 such as a CRT display may be available, and the data sets may be displayed in tabular form as illustrated, perhaps with additional information, such as threshold value and specific tool parameters, displayed as well. In the hand-held embodiment, restrictions on display size may well obtain, and the format for display may have to be modified to comport with available space. In the hand-held version, the display may be a liquid crystal display (LCD), for example, of either a character or dot-matrix type. Of course, for either configuration of measuring instrument 501, the results may be printed to an optional printer 508, using processes and hardware well-known in the art.

Once the data sets have been displayed, the tool is adjusted by implementing the proper adjustment procedure for that particular tool. As discussed, the adjustment procedure may involve the insertion or removal of shims or spacers at strategic locations, in order to raise or lower a desired corner or corners of the tool. Of course, this adjustment process is carried out in response to the detected measurement events, and in a fashion consistent with the measurement results. After a tool adjustment is made, the measurement steps are repeated, and the process is continued until the results indicate that the tool is properly aligned.

Depending upon the particular tool being set up or adjusted, a "window" of time will generally be established during which the force applied to each sensing cell should cross the event threshold. For the tool of the illustrative embodiment, for example, the measurement events should occur within about 1 millisecond (ms) of each another.

The tool set-up technique of the present invention also contemplates a mode in which a multiple point time history can be measured and displayed. This mode displays force values (these may be relative or absolute) and associated time of occurrence of each of these events. Unlike the multiple point contact timing mode described above, this mode forms data sets that correspond to a complete history of measurement events for each input to the data acquisition unit 502.

The multiple point time history may be of particular use in tool adjustment, rather than set-up. The actual material being operated upon by the tool, as is the case in the illustrative embodiment described below, may be inserted and measurements taken. The material often determines, at least to a degree, the final adjustments that may have to be made to a tool to produce properly formed or molded pieces.

Just as in the previously described mode, the operator may specify thresholds for each input 509-512 to the data acquisition unit 502. When the tool is operated, the data acquisition unit 502 passes digital data to the processor 503, over the data bus 513, and the processor forms multiple data sets that include identifying indicia for each input 509-512, digital value of the measured parameter, and time of measurement, with the time value being obtained through access to the real time clock. In this measurement mode, measurement activity may continue until parameter values have returned to values equal to or greater than their initial values, for example, or until a preselected time has elapsed. Other techniques for controlling duration of measurement are also possible.

Once this plurality of data sets has been recorded in the memory 504, the processor 503 displays the results in a graphical format, with the curves representing each input 509-512 rendered readily distinguishable from each other by displaying the curves using different dashed-line patterns, for example. Of course, the collection of curves may be displayed in different colors to distinguish one from another, if the associated display 507 has that capability. In any case, the curves resulting from the data set display may be printed on an optional printer 508.

After the display of time history is complete, the tool is adjusted consistent with the displayed data. Because a true history of measurement activity is presented is this mode, different types of adjustments, and more accurate ones, may now be made to the tool. This is because precise duration of engagement for each sensor can be discerned from the displayed data, as can rate of change of contact force. After adjustments to the tool set-up are made, the measurement process is typically repeated until tool alignment conforms to specifications.

Figure 6:
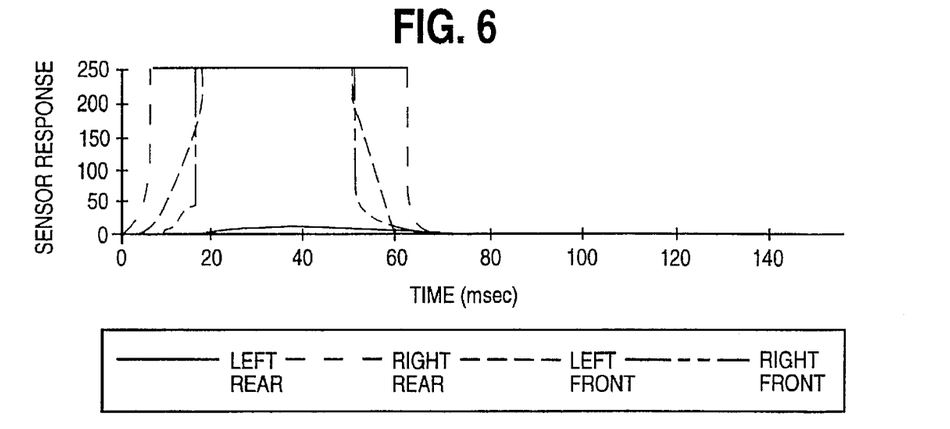
FIGS. 6–8 are graphical displays of data sets obtained during multiple point time history mode of operation.

FIG. 6 shows a typical multiple point time history display of the type described above. A legend is also displayed to aid in identifying the individual curves. As can be appreciated from an examination of FIG. 6, the sensing cell on the left rear stop never had sufficient force to reach the contact threshold of 50 units. Since this test is typically run with actual material in the tool, it is likely that movement of the tool is being constrained not by the stops on the tool, but by the material itself.

Consequently, in the illustrative embodiment of the invention, the tonnage of the press is increased from an initial setting of 90 tons to a setting of 105 tons. The multiple point timing history measurement is then repeated with a new piece of material inserted into the tool.

Figure 7:
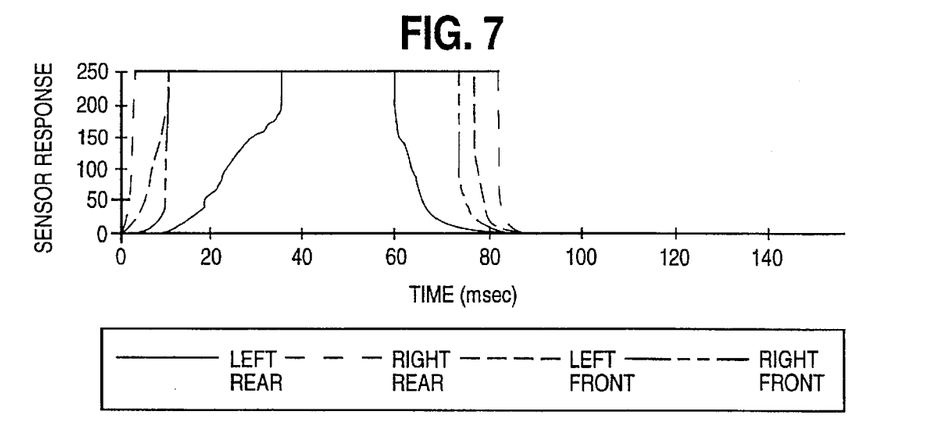

FIG. 7 shows the multiple point time history display after this press tonnage adjustment. It will be noted from the curves displayed in FIG. 7 that the sensor identified as the left rear is now registering sufficient force to cross the arbitrary 50 unit threshold, but the rate of loading and unloading observable at this sensing cell location is significantly different from the profiles shown at the other sensing cell locations. In addition, the dwell time, or the time during which the force exceeds the 255 unit upper limit, is much lower for the left rear sensing cell. Again, an increase in press tonnage may be indicated.

Figure 8:
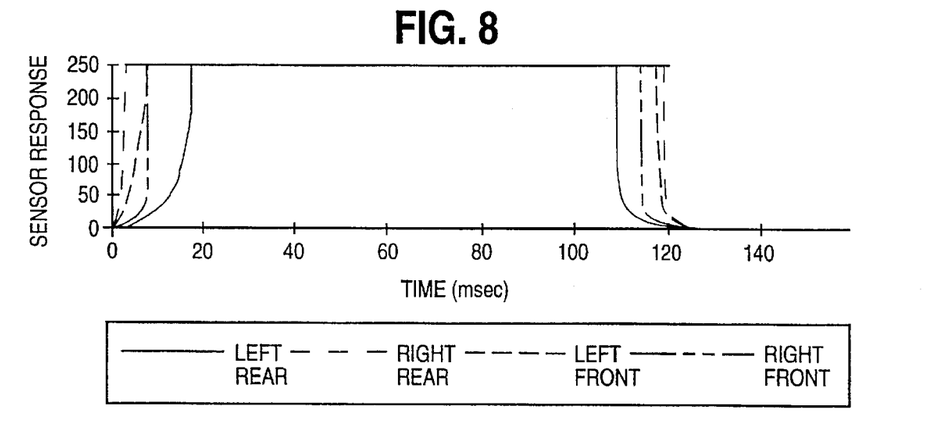

After the tonnage of the press is increased once more, from 105 tons to 145 tons, the dwell time for the left rear sensing cell is more consistent with the dwell times of the other sensing cells, as shown in FIG. 8. Thus, utilizing the set-up and adjustment techniques of the present invention provides a powerful operational diagnostic capability.

There have been described herein a method and apparatus for improved tool set-up using thin tactile sensors that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for adjusting the relationship between two operating parts of a tool to provide for the optimal tool set-up, the method comprising the steps of:
   (a) affixing a plurality of sensing cells to confronting portions of the tool at a plurality of spaced locations thereon;
   (b) electrically connecting said sensing cells to a measuring instrument;
   (c) establishing a measurement event threshold for each said electrically connected sensing cell;
   (d) detecting occurrences of said measurement events for each electrically connected sensing cell;
   (e) evaluating said detected occurrences to determine the spacing between the confronting portions of the tool at the plurality of spaced locations; and
   (f) in response to said evaluating step, adjusting the spacing between the confronting portions of the tool consistent with said measurement events.

2. The method in accordance with claim 1, wherein the step of affixing a plurality of sensing cells to the tool comprises affixing a thin tactile sensing cell between opposing, relatively flat areas of the tool at each of said spaced locations.

3. The method in accordance with claim 2, wherein the sensing cells are removably affixed to the tool.

4. The method in accordance with claim 3, wherein the sensing cells are removably affixed to the tool with an adhesive interposed between the sensing cells and the tool.

5. The method in accordance with claim 1, wherein the step of electrically connecting comprises electrically connecting said sensing cells to a data acquisition and control unit.

6. The method in accordance with claim 5, wherein the data acquisition and control unit is an integral part of a self-contained, portable measuring instrument, and the method further comprises the steps of:
   (f) recording occurrences of each said measurement event and relative time of occurrence of each said measurement event to create a plurality of data sets; and
   (g) displaying the data sets.

7. The method in accordance with claim 6, wherein the self-contained, portable measuring instrument is a hand-held measuring instrument.

8. The method in accordance with claim 5, wherein the data acquisition and control unit is operatively coupled to a personal computer.

9. The method in accordance with claim 1, wherein the step of establishing a measurement event threshold for each electrically connected sensing cell comprises establishing an electrically discernible parameter value recognizable by the measuring instrument, for each of the sensing cells to which the measuring instrument is electrically connected, to provide a threshold value for each electrically connected sensing cell.

10. The method in accordance with claim 9, wherein the electrically discernible parameter value is electrical resistance.

11. The method in accordance with claim 9, wherein the step of detecting occurrences of measurement events comprises the step of periodically sampling the electrically discernible parameter at each of the sensing cells to provide a sampled value.

12. The method in accordance with claim 11, wherein the step of periodically sampling the electrically discernible parameter further includes the step of comparing the sampled value to the threshold value.

13. The method in accordance with claim 11, wherein the step of detecting occurrences of each measurement event further comprises the steps of:
   (g) recording, in a memory means, the sampled value corresponding to occurrence of a first measurement event;
   (h) recording, in a memory means, the sampled value corresponding to occurrence of subsequent measurement events; and
   (i) recording, in a memory means, relative time of occurrence of the subsequent measurement events with respect to occurrence of the first measurement event.

14. The method in accordance with claim 1, wherein the steps of detecting and evaluating further comprise the steps of recording only a first occurrence of each said measurement event that exceeds the measurement event threshold for each electrically connected sensing cell, and evaluating each said first occurrence to determine the spacing between the confronting portions of the tool at the plurality of spaced locations.

15. The method in accordance with claim 6, wherein the step of displaying the data sets comprises printing the data sets on a printer.

16. The method in accordance with claim 6, wherein the step of displaying the data sets comprises displaying the data sets on a display means.

17. The method in accordance with claim 6, wherein the step of displaying the data sets comprises displaying only a first occurrence of a measurement event that exceeds the measurement event threshold for each electrically connected sensing cell, and relative time of occurrence of each measurement event with respect to said first occurrence of a measurement event.

18. The method in accordance with claim 6, wherein the step of displaying the data sets comprises displaying occurrences of measurement events, and relative times of occurrence, in an amplitude-versus-time graphical format.

19. The method in accordance with claim 18, wherein data set display for each electrically connected sensing cell is visually distinguishable from data set displays for other electrically connected sensing cells.

20. Apparatus for adjusting the relationship between two operating parts of a tool to provide for the optimal tool set-up for a tool having a plurality of spaced apart, relatively flat, opposing regions that contact one another during tool set-up and adjustment, the apparatus comprising:
   a sensing cell positioned within each of said plurality of regions;

means for electrically connecting said sensing cells to a measuring instrument;

means for establishing a measurement event threshold for each said electrically connected sensing cell;

means for detecting occurrences of measurement events for each said electrically connected sensing cell;

means for evaluating said detected occurrences to determine the spacing between the plurality of spaced apart, relatively flat, opposing regions; and means for adjusting the spacing between the plurality of spaced apart, relatively flat, opposing regions consistent with said measurement events.

21. The apparatus of claim 20, wherein the plurality of sensing cells comprises a plurality of thin tactile sensing cells interposed between the spaced apart, relatively flat, opposing regions.

22. The apparatus of claim 20, wherein the means for electrically connecting said sensing cells comprises means for connecting said sensing cells, through associated electrical connectors, to a data acquisition and control unit.

23. The apparatus of claim 20, wherein the means for establishing a measurement event threshold comprises means for entering a threshold value via an associated keyboard.

24. The apparatus of claim 20, wherein the means for detecting occurrences of measurement events comprises means for detecting an analog signal value that exceeds the measurement event threshold converting the analog value to a digital value, and passing the digital value to a processor.

25. The method in accordance with claim 1, wherein the step of evaluating further comprises determining an offset in parallelism between the confronting portions of the tool and the step of adjusting further comprises correcting the offset in parallelism.

26. The apparatus in accordance with claim 20, wherein said means for evaluating further comprises means for determining an offset in parallelism between the opposing regions and said means for adjusting further comprises means for correcting the offset in parallelism.

* * * * *